(12) United States Patent
Costante et al.

(10) Patent No.: US 12,328,233 B2
(45) Date of Patent: *Jun. 10, 2025

(54) FINGERPRINTING ASSISTED BY SIMILARITY-BASED SEMANTIC CLUSTERING

(71) Applicant: FORESCOUT TECHNOLOGIES, INC., San Jose, CA (US)

(72) Inventors: Elisa Costante, Eindhoven (NL); Daniel Ricardo dos Santos, Rotterdam (NL); Guillaume François Christophe Dupont, Eindhoven (NL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,541

(22) Filed: Apr. 18, 2024

(65) Prior Publication Data

US 2024/0291721 A1 Aug. 29, 2024

Related U.S. Application Data

(63) Continuation of application No. 17/362,770, filed on Jun. 29, 2021, now Pat. No. 12,003,383.

(60) Provisional application No. 63/181,908, filed on Apr. 29, 2021.

(51) Int. Cl.
*H04L 41/14* (2022.01)
*G06N 5/04* (2023.01)
*G06N 20/00* (2019.01)
*H04L 41/12* (2022.01)

(52) U.S. Cl.
CPC ............... *H04L 41/14* (2013.01); *G06N 5/04* (2013.01); *G06N 20/00* (2019.01); *H04L 41/12* (2013.01)

(58) Field of Classification Search
None
See application file for complete search history.

(56) References Cited

U.S. PATENT DOCUMENTS

| | | | |
|---|---|---|---|
| 8,844,041 B1 * | 9/2014 | Kienzle | H04L 63/1433 |
| | | | 709/224 |
| 10,586,177 B1 * | 3/2020 | Choueiter | G06N 7/01 |
| 2017/0250879 A1 * | 8/2017 | Chadha | H04L 61/35 |
| 2019/0052659 A1 | 2/2019 | Weingarten et al. | |
| 2020/0067777 A1 * | 2/2020 | Tandel | H04L 41/12 |
| 2020/0193315 A1 * | 6/2020 | Sunkara | G06F 21/44 |
| 2020/0287924 A1 * | 9/2020 | Zhang | G06F 16/288 |

(Continued)

OTHER PUBLICATIONS

International Search Report and Written Opinion dated Jun. 15, 2022 from International Application PCT/US2022/020076 filed Mar. 11, 2022; pp. 10.

*Primary Examiner* — Scott B Christensen
(74) *Attorney, Agent, or Firm* — Womble Bond Dickinson (US) LLP

(57) ABSTRACT

Systems, methods, and related technologies for entity classification are described. Entity attributes for entity classification are determined and entities coupled to a network are monitored. Values for each entity attribute for each entity coupled to the network are identified. A semantic similarity, between the plurality of entities, of the values for each entity attribute is determined. The entities are clustered into multiple entity clusters based on the semantic similarity of the values for each of the entity attributes for the entities.

20 Claims, 14 Drawing Sheets

(56) References Cited

U.S. PATENT DOCUMENTS

| | | |
|---|---|---|
| 2021/0099480 A1 | 4/2021 | Ivanov et al. |
| 2021/0203615 A1* | 7/2021 | Roy ................... G06N 20/00 |
| 2021/0281566 A1* | 9/2021 | Akella ................. H04W 12/71 |
| 2021/0306368 A1* | 9/2021 | Zhang ................. H04L 63/1433 |
| 2021/0328986 A1* | 10/2021 | Vasseur ................ H04L 63/20 |
| 2021/0335505 A1* | 10/2021 | Tedaldi ................ G06F 18/251 |
| 2022/0092087 A1* | 3/2022 | Raghuramu ........... H04L 63/20 |
| 2022/0210079 A1* | 6/2022 | Koren ................. G06F 18/24 |

\* cited by examiner

| Source | Features | Example | Function |
|---|---|---|---|
| DHCP | Class | "Printers" | Levenshtein |
| | Options | (53,61) | Jaccard |
| | Param Request List | (1,121,3) | Jaccard |
| | Vendor | Cisco | Levenshtein |
| | Operating System | Windows Vista7 | Levenshtein |
| HTTP | Banner Headers | (Mozilla/4.0, Microsoft) (Server: Microsoft-IIS) | Jaccard |
| MAC | Vendor (24 bits) | "Hewlett Packard" | Levenshtein |
| | OUI | cc3e5f | Levenshtein |
| Nmap | Banner | (21/tcp.ftp.net., 80/tcp, http) | Jaccard |
| | OS | (Windows 7, Windows) | Jaccard |
| | Function | Windows | Levenshtein |
| | Open Ports | (135/tcp, 445/tcp) | Jaccard |
| Pkt | Fingerprint | (Windows NT kernel 5.x) | Levenshtein |
| Other | Group | (Network, Non Corporate) | Jaccard |
| | Network Function | Windows Machine | Levenshtein |

*FIG. 8*

| Feature | Description | Value type | Value example | Similarity function |
|---|---|---|---|---|
| Open ports [13] | The set of TCP and UDP ports open on a device | Set of strings | {"139/TCP", "445/TCP", "500/UDP"} | Jaccard |
| Vendor | NIC vendor based on the device's MAC prefix | String | "hewlett packard enterprise" | Levenshtein |
| HTTP banner | Set of HTTP User Agents used by applications on a device to communicate on the network | List of strings | ["Mozilla/4.0", "Microsoft-WNS/10.0", "Microsoft-CryptoAPI/10.0"] | Jaccard |
| nmap OS | Fingerprint of a device determined by Nmap, which is either a single OS match or a set of possible OS candidates | Set of strings | {"Microsoft Windows 7", "Windows Server 2012", "Windows 8.1 Update 1"} | Jaccard |
| nmap function | Network function of a device determined by nmap | String | "Windows" | Levenshtein |
| DHCP class [41] | Device class according to the DHCP fingerprint | String | "Printers" | Levenshtein |
| DHCP options [41] | The host DHCP options fingerprint | Set of strings | {"53", "61", "12", "81", "60", "55"} | Jaccard |
| mac24 | --- | String | "cc9891" | Levenshtein |
| nmap Banner | Set of user agents detect by nmap | Set of strings | {"23/tcp Cisco router telnetd", "80/tcp Cisco IOS http config"} | Jaccard |
| p0f Fingerprint In Group | List of AC Groups that the device belongs to | Set of strings | {"Windows NT kernel 5.x", "Windows NT kernel"} | Jaccard |
| p0f SA fingerprint | Operating System fingerprint determined by p0f | Set of Strings | {"Group Tree", "Network Devices", "Non Corporate Hosts"} | Jaccard |
| HTTP Headers | --- | Set of Strings | {"Windows 7 or 8"} | Jaccard |
| Network Function | Function of device determined by p0f | String | {"WWW-Authenticate: NTLM (80/TCP)", "Server: Microsoft-IIS/6.0 (80/TCP)"} | Jaccard |
| DHCP Vendor Class | --- | String | {"Windows Machine"} | Levenshtein |
| DHCP OS | --- | String | {"Cisco Systems, Inc. IP Phone CP-8811"} | Levenshtein |
|  |  |  | {"Microsoft Windows Vista/7 or Server 2008 (Version 6.0)"} | Levenshtein |

*FIG. 9*

| Open ports | ID | $d_1$ | $d_2$ | $d_3$ | $d_4$ |
|---|---|---|---|---|---|
| {'135/TCP', '137/UDP', '139/TCP', '445/TCP', '500/UDP'} | $d_1$ | 1 | 0.83 | 0 | 0.6 |
| {'135/TCP', '137/UDP', '139/TCP', '445/TCP', '500/UDP', '5084/UDP'} | $d_2$ | 0.83 | 1 | 0 | 0.5 |
| {'5000/TCP', '7000/TCP', '62078/TCP'} | $d_3$ | 0 | 0 | 1 | 0 |
| {'139/TCP', '445/TCP', '500/UDP'} | $d_4$ | 0.6 | 0.5 | 0 | 1 |

*FIG. 10*

| ID | Label | Open Ports | Vendor | HTTP Banner | nmap OS | nmap function | DHCP class | DHCP options |
|---|---|---|---|---|---|---|---|---|
| $ID_1$ | IT/Computer | {'515/TCP', '500/UDP', '40001/TCP', '137/UDP', '123/UDP', '445/TCP', '139/TCP'} | inventec | {'Microsoft BITS/7.5', 'SMS CCM 5.0', 'ccmhttp'} | Microsoft Windows 7 SP0 – SP1, Windows Server 2008 SP1, Windows 8, or Windows 8.1 Update 1 | Windows | Windows | {'53', '61', '12', '81', '60', '55'} |
| $ID_2$ | IT | {'22/TCP', '631/TCP', '21/TCP', '8080/TCP', '80/TCP', '445/TCP', '443/TCP', '139/TCP'} | qnap | {'curl/7.54.1'} | Linux 3.10 – 3.19 or Linux 3.11 – 4.1 or Linux 3.2 – 4.0 or Linux 2.6.32 or Linux 2.6.32 or 3.10 or Linux 3.12 or Linux 2.6.18 – 2.6.22 or Linux 2.6.32 – 2.6.35 or Linux 2.6.32 – 2.6.39 or Linux 3.13 | Linux | - | - |
| $ID_3$ | Unknown | {'80/TCP', '443/TCP', '515/TCP', '55835/UDP', '55834/UDP', '55836/UDP', '55839/UDP', '55838/UDP', '55937/UDP', '55936/UDP'} | canon | - | Canon PIXMA MP650; MP620; MG5220; MG6100; or MX800-series printer | Canon PIXMA MP650; MP620; MG5220; MG6100; or MX800-series printer | Smartphone/ PDAs/ Tablets | {'53', '61', '55'} |

*FIG. 11*

| Cluster ID | Size | # of Distinct Functions | List of Distinct Functions | Reason for Cluster | Reason for Cluster (detailed) | Complete Results | Cluster Score |
|---|---|---|---|---|---|---|---|
| 1 | 58 | 2 | Information Technology/Computer: 7<br>Unknown: 51 | nmap_def_fp7 (0.94)<br>nmap_netfunc7 (1.00)<br>va_netfunc (1.00) | nmap_netfunc7: Linksys BEFW11S4 WAP<br>va_netfunc: Windows Machine | openports (0.33)<br>vendor (0.02)<br>ebanner_http (0.57)<br>nmap_def_fp7 (0.94)<br>nmap_netfunc7 (1.00)<br>va_netfunc (1.00) | 0.6433333 |

FIG. 12

| Cluster ID | Size | # of Distinct Functions | List of Distinct Functions | Reason for Cluster | Reason for Cluster (detailed) | Complete Results | Cluster Score |
|---|---|---|---|---|---|---|---|
| 8 | 178 | 3 | Information Technology/Computer: 167<br>Information Technology/Mobile: 7<br>Unknown: 4 | nmap_def_fp7 (1.00)<br>nmap_netfunc7 (1.00)<br>va_netfunc (1.00) | vendor: hewlett packard<br>nnamp_netfunc7: Windows<br>va_netfunc: Windows Machine | openports (0.47)<br>vendor (1.00)<br>ebanner_http (0.27)<br>nmap_def_fp7 (0.65)<br>nmap_netfunc7 (1.00)<br>va_netfunc (1.00) | 0.731666 |

FIG. 13

FINGERPRINTING ASSISTED BY SIMILARITY-BASED SEMANTIC CLUSTERING

RELATED APPLICATIONS

This application claims priority from U.S. application Ser. No. 17/362,770 filed on Jun. 29, 2021, which claims priority and the benefit of U.S. Provisional Patent Application No. 63/181,908 filed on Apr. 29, 2021, the entire contents of which is incorporated herein by reference in its entirety.

TECHNICAL FIELD

Aspects and implementations of the present disclosure relate to network monitoring, and more specifically, classification of entities of a network.

BACKGROUND

As technology advances, the number and variety of devices or entities that are connected to communications networks are rapidly increasing. Each device or entity may have its own respective vulnerabilities which may leave the network open to compromise or other risks. Preventing the spreading of an infection of a device or entity, or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 8 an example feature set selected for similarity-based semantic clustering to classify devices of a network according to embodiments of the present disclosure.

FIG. 9 an example feature set selected for similarity-based semantic clustering to classify devices of a network according to embodiments of the present disclosure.

FIG. 10 illustrates a pair-wise similarity matrix of multiple devices and open ports of the devices according to embodiments of the disclosure.

FIG. 11 depicts a featurized data set for multiple monitored devices coupled to a monitored network for performing device clustering according to embodiments of the disclosure.

FIG. 12 illustrates an example cluster according to embodiments of the present disclosure.

FIG. 13 illustrates another example cluster according to embodiments of the present disclosure.

DETAILED DESCRIPTION

Figure 1:
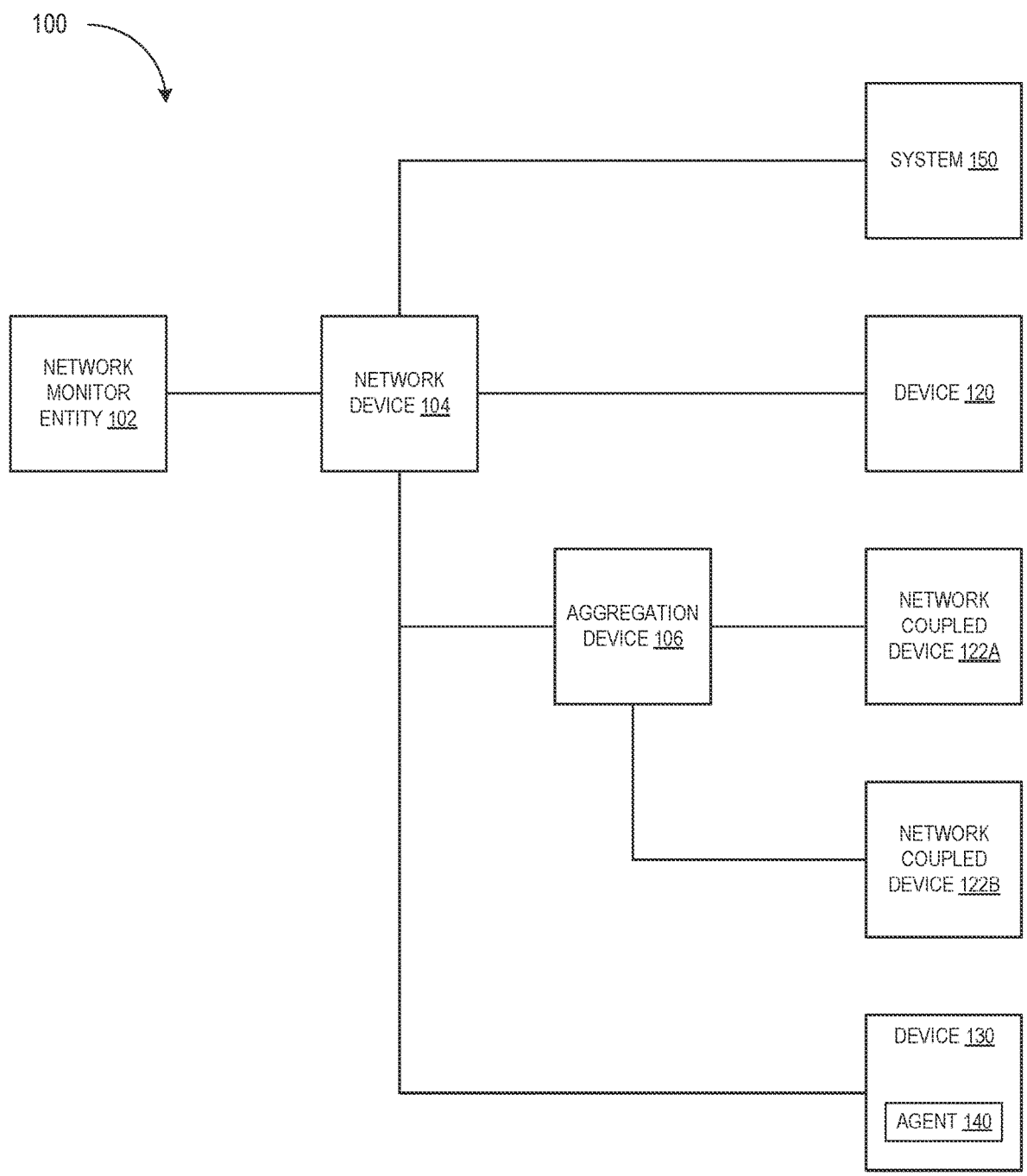
FIG. 1 depicts an illustrative communication network in accordance with one implementation of the present disclosure.

Aspects and implementations of the present disclosure are directed to fingerprinting of devices of a network using similarity-based semantic clustering. The systems and methods disclosed can be employed with respect to network security, among other fields. More particularly, it can be appreciated that devices or entities with vulnerabilities are a significant and growing problem. At the same time, the proliferation of network-connected devices (e.g., internet of things (IoT) devices such as televisions, security cameras (IP cameras), wearable devices, medical devices, etc.) can make it difficult to effectively ensure that network security is maintained. Classification of devices can be particularly important for securing a network because lack of knowledge about what an entity is can prevent application of appropriate security measures. Accordingly, described herein in various implementations are systems, methods, techniques, and related technologies, which allow for improved classification (e.g., fingerprinting) of entities to enable securing of a network including applying and performing one or more network security policies based on classification of an entity.

Accordingly, knowing precisely what devices exist in a monitored network, a capability known in the network security community as asset inventory can be used for effective security controls within a network. In the current heterogeneous device landscape of the Internet of Things (IoT), asset inventory can be achieved by monitoring network traffic, identifying individual devices from the network traffic, and fingerprinting those devices to be able to classify them into a network function (e.g., smartphone, VOIP phone, printer, IP camera, etc.) or, more precisely, into a specific vendor/model combination.

Conventionally, fingerprinting of a device, or entity, is performed by comparing attributes of a device obtained from network traffic of the device on the network with a database of known fingerprints. In some examples, the database of known fingerprints may be open source or proprietary. If a set of attribute values for a device obtained from the network traffic matches a unique set of attribute values stored on the database, then the device is assigned a corresponding classification value. For instance, if a monitored device requests a website using a particular user-agent and the database has a record for that user-agent associating it to a particular type of smartphone, then the device can be classified as that type of smartphone. Fingerprinting rules may use arbitrary logical combinations of any number of attributes and attribute values. Common attributes used in fingerprinting include user-agents, dynamic host configuration protocol (DHCP) information, media access control (MAC) address vendor (e.g., organizationally unique identifier (OUI)), open ports, and others.

Additionally, conventional methods of device fingerprinting include a network monitoring entity that monitors the traffic exchanged by a set of devices connected to a network switch. The network monitoring entity classifies the monitored devices based on a local database of device fingerprints. Each of the components of the network (e.g., the monitored devices and the network switch) may be part of a monitored network. Any number of networks may be monitored by one or more network monitoring entities. For example, information about each device in each monitored network is sent to a device cloud and used by researchers to manually analyze the whole dataset and create new fingerprinting rules based on unique patterns identified in the large dataset.

Conventional device fingerprinting, however, has several limitations. Manually defined fingerprinting rules are error-prone and expensive to identify, codify, and maintain. For example, conventional fingerprinting may be limited by low coverage of fingerprinted devices due to a limited number of identified rules, which may result in many devices not being classified. Additionally, conventional fingerprinting may have limited granularity of fingerprinting due to having fingerprinting rules that only identify high-level device functions (e.g., Mobile Device), rather than more granular functions (e.g., Smartphone or Tablet) or vendor/model combinations. Furthermore, conventional fingerprinting may result in misclassification due to having fingerprinting rules that classify devices to a wrong class. The low coverage, limited granularity, and misclassifications may be due to the limitations of manually identifying fingerprinting rules despite the large number of fingerprinting rules that must be identified and managed to accurately and sufficiently classify the ever increasing number of connected devices.

Accordingly, described herein in various implementations are systems, methods, techniques, and related technologies, which improve device fingerprinting and classification by using similarity-based clustering techniques to identify fingerprinting rules for fingerprinting and classifying entities of a network. Similarity-based clustering may be used to present researchers with strong candidates for new fingerprinting rules or previously defined fingerprinting rules to be fixed (e.g., due to misclassifications) or corrected. Similarity-based clustering may also be used to identify new fingerprinting rules to be automatically added to a rule database or to automatically classify devices without first creating fingerprinting rules. Embodiments may overcome the problems of conventional fingerprinting by automatically identifying, based on device attribute data, fingerprinting rules for increased coverage and for classifying devices with better accuracy and to a higher level of granularity. An action that is performed automatically may be an action that can be performed without requiring human or user input, invocation, or interaction.

Embodiments include a methodology to compare attributes of devices to one another and automatically group the devices that are similar, based on the device attributes. For example, one or more particular device features may be used to perform similarity-based clustering, from which one or more clusters can be identified. The defining features of each cluster may then be identified to generate a fingerprinting rule for devices with features similar to the cluster. Hierarchical clusters (e.g., clusters within clusters) can be identified for classification of devices at different levels of granularity. In some embodiments, the features used for similarity-based clustering may be defined by a researcher. Additionally, a similarity function may also be defined for each individual feature. Thus, an importance level associated with how similar a feature is for a cluster of devices can be provided such that the features that define a cluster (e.g., the most similar features causing the devices to be clustered) may be identified.

In some embodiments, a researcher may first define one or more device attributes, also referred to as features, (e.g., by analyzing a device attributes database) to be used for similarity-based clustering. For example, the researcher may use domain specific knowledge to select the features that may be relevant for similarity-based clustering. The researcher may also define a similarity function for each of the one or more features defined. In various embodiments, a machine learning model, or other artificial intelligence model may define the one or more features and/or the associated similarity functions for each of the features. Accordingly, a similarity score between devices can be determined for each feature using the defined similarity functions, where the function returns a higher similarity score for devices that have more similar values for the particular feature.

Once the features and the similarity functions are defined, a network monitor entity may monitor network traffic of devices of a network and may perform similarity-based semantic clustering on some or all the devices of the monitored network based on the network traffic. For example, the network monitor entity may identify features of the devices of the network based on the network traffic. The network monitor entity may then use the features of the device that correspond to the features defined above by the researcher to perform similarity-based clustering on the monitored devices. The similarity-based clustering algorithm may form clusters of similar devices. The clusters of similar devices may be used to generate one or more fingerprinting rules or to automatically classify the devices to apply an appropriate network policy.

In one embodiment, the network monitor entity may provide the clusters to a researcher. The researcher may manually analyze each cluster formed by the clustering algorithm to generate new fingerprinting rules for future fingerprinting and classification of devices. In one example, the network monitor entity may sort the clusters by a cluster score (e.g., a metric for cluster quality) and then provide the clusters to the researcher as sorted. In another example, the researcher may generate the new fingerprinting rules based on the function of devices that are included in the cluster and the values of the features of the devices included in the cluster. In other words, the researcher may associate the values of the features of the devices with a device function that the devices included in the cluster have in common. For example, if a cluster is formed by known "IP cameras" and "Unknown" devices that all share strong similarity with respect to an "open ports" feature and a "vendor" feature, the researcher may analyze such cluster and determine whether to create a new fingerprinting rule assigning the function "IP camera" to devices (e.g., devices newly added to the network, devices assigned "Unknown" or that are otherwise unclassified or misclassified) having those values in their observed attributes. The clustering module or the researcher may then provide the new fingerprinting rules to the network monitor entity to fingerprint and classify devices on the network.

In another embodiment, the network monitor entity may use the clusters to automatically generate fingerprinting rules (e.g., without researcher review or input). For example, if the cluster score for a cluster exceeds a minimum threshold and a set of similarity scores for the features of the cluster exceeds a minimum threshold, the clustering module may automatically generate a rule and provide the rule to the researcher for approval or provide the rule to the network monitoring device for future device fingerprinting. The network monitor entity may additionally provide, to the researcher, the cluster score, similarity scores for each features, and other cluster information for reviewing the automatically generated rule. The researcher may then approve or reject the automatically generated rule.

In another embodiment, the network monitor entity may use the clusters to automatically fingerprint and classify devices with or without generating new fingerprinting rules. For example, the network monitor entity may avoid generating fingerprinting rules and adding them to a database and, rather, use the clusters themselves as fingerprinting rules and automatically assign a function to a device when the cluster score and similarity scores for a feature meet a threshold. In such an embodiment, a fingerprinting database may be unnecessary and the classification of devices may rely in large part, or completely, on the clustering algorithm. In some embodiments, the steps of clustering and generating rules can be performed continuously or periodically. For example, the network monitor entity may perform the clustering algorithm and classification of device each time a new monitored device is added to the network, at predetermined intervals with a batch of new devices added to the network since the previous classification, or a combination of the two.

Accordingly, described herein in various implementations are systems, methods, techniques, and related technologies, which may generate fingerprinting rules, perform classifications, or a combination thereof. As described herein, various techniques can be used to perform fingerprinting of entities assisted by similarity-based semantic clustering, as well as network segmentation and risk management.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Network segmentation can be used to enforce security policies on a network, for instance in large and medium organizations, by restricting portions or areas of a network which an entity can access or communicate with. Segmentation or "zoning" can provide effective controls to limit movement across the network (e.g., by a hacker or malicious software). Enforcement points including firewalls, routers, switches, cloud infrastructure, other network devices/entities, etc., may be used to enforce segmentation on a network (and different address subnets may be used for each segment). Enforcement points may enforce segmentation by filtering or dropping packets according to the network segmentation policies/rules. The viability of a network segmentation project depends on the quality of visibility the organization has into its entities and the amount of work or labor involved in configuring network entities.

Although embodiments are described herein with reference to network devices, embodiments also apply to any entity communicatively coupled to the network. An entity or entities, as discussed herein, include devices (e.g., computer systems, for instance laptops, desktops, servers, mobile devices, IoT devices, OT devices, etc.), endpoints, virtual machines, services, serverless services (e.g., cloud-based services), containers (e.g., user-space instances that work with an operating system featuring a kernel that allows the existence of multiple isolated user-space instances), cloud-based storage, accounts, and users. Depending on the entity, an entity may have an IP address (e.g., a device) or may be without an IP address (e.g., a serverless service). The features selected for entity clustering may depend on the entity, or entities being clustered and fingerprinted, as described herein.

The enforcement points may be one or more network entities (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any entity that is capable of filtering, controlling, restricting, or the like communication or access on a network.

FIG. 1 depicts an illustrative communication network 100, in accordance with one implementation of the present disclosure. The communication network 100 includes a network monitor entity 102, a network device 104, an aggregation device 106, a system 150, devices 120 and 130, and network coupled devices 122A-B. The devices 120 and 130 and network coupled devices 122A-B may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices/entities of communication network 100 may communicate in a variety of ways including wired and wireless connections and may use one or more of a variety of protocols.

Network device 104 may be one or more network entities configured to facilitate communication among aggregation device 106, system 150, network monitor entity 102, devices 120 and 130, and network coupled devices 122A-B. Network device 104 may be one or more network switches, access points, routers, firewalls, hubs, etc.

Network monitor entity 102 may be operable for a variety of tasks including performing device clustering, fingerprinting rule generation, and device classification, as described herein. Network monitor entity 102 may perform similarity-based semantic clustering on one or more devices coupled to network device 104 using device features or device attributes selected for device clustering. Network monitor entity 102 may further generate one or more device fingerprinting rules based on one or more clusters of the one or more devices coupled to the network device 104. Network monitor entity 102 may also perform fingerprinting and classification of devices of the network based on the generated fingerprinting rules, the device clusters, or a combination of the fingerprinting rules and the device clusters. In some embodiments, network monitor entity 102 can use local resources (e.g., processing, memory, data resources, or other resources), cloud resources, or a combination thereof for performing the device clustering, fingerprinting rule generation, and device classification.

Network monitor entity 102 can determine one or more enforcement points where the entity is communicatively coupled to the network and thereby determine the one or more enforcement points closest to the entity. For example, network monitor entity 102 may access information on a switch (e.g., a switch cache) to determine a port (e.g., physical port, wireless port, or virtual port) where an entity with a particular IP address or MAC address or other identifier is communicatively coupled. Network monitor entity 102 may also access information from a wireless access point where the entity is communicatively coupled. In some embodiments, network monitor entity 102 may poll information from a cloud service to determine where an entity is communicatively coupled or connected to a network. In various embodiments, network monitor entity 102 may access syslog or SNMP information from an entity itself to determine where an entity is communicatively coupled or connected to a network (e.g., without accessing information from a network entity or enforcement point). Network monitor entity 102 supports applying access policies in situations where an entity is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the entity, network monitor entity 102 translates the access policy into one or more commands that will be used to configure the access rules on the one or more enforcement points. The closest enforcement point to an entity may be an enforcement point where the entity is communicatively coupled. The enforcement point may be network entity or network infrastructure device closest in proximity (e.g., physical proximity) to the entity. The enforcement point comprises the port where the entity is communitive coupled to the network, and communication to and from the entity is sent first through that port. In some embodiments, the port of the enforcement point is the last point of communication within network infrastructure before communication is sent to the entity. In various embodiments, the closest enforcement point is where communication from the entity is initially sent when communications are sent from the entity (e.g., prior to communications with the network backbone or Internet backbone). For example, the closest enforcement to an entity connected to a switch is the switch. As another example, the closest enforcement point to an entity wirelessly communicatively coupled to a wireless access point is wireless access point. In various embodiments, network monitor entity 102 may access the current configuration of the one or more enforcement points to determine the access rules (e.g., ACLs) that are to be applied to the one or more enforcement points, as described herein. In some embodiments, an entity is communicatively coupled to a wireless controller via a wireless access point and the wireless controller or a switch is the closest enforcement point (e.g., based on the wireless controller or the switch being able to apply access rules, for instance ACLs, to communications of the entity, for instance, in the case where the wireless access point is not able to or does not have the functionality to apply access rules). In various embodiments, an entity is communicatively coupled to a layer 3 switch via a layer 2 switch and the layer 3 switch is the closest enforcement point (e.g., based on the layer 3 switch being able to apply access rules, for instance ACLs, to communications of the entity, for instance, in the case where the layer 2 switch is not able to or does not have the functionality to apply access rules).

Network monitor entity 102 may then apply or assign the access rules to the one or more enforcement points closest to the entity. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Network monitor entity 102 may provide an interface (e.g., a graphical user interface (GUI)) for viewing, monitoring, and selecting device features and similarity functions for the features, as described herein. Network monitor entity 102 may further monitor network traffic over time to reclassify entities as new entities join the network, entities rejoin the network, and new models are made available.

Network monitor entity 102 may further perform a variety of operations including identification, classification, and taking one or more remediation actions (e.g., changing network access of an entity, changing the virtual local area network (VLAN), sending an email, sending a short message service (SMS) message, etc.).

In some embodiments, an enforcement point may be a router, firewall, switch, hypervisor, software-defined networking (SDN) controller, virtual firewall, or other network entity or infrastructure that may have an ACL like or rule like policy or functionality to apply based on the port where an entity is communicatively coupled thereto. Enforcements points may also be a next generation firewall (NGFW) and cloud infrastructure. A NGFW can be updated with an ACL like policy regarding an entity accessing the Internet. Cloud infrastructure (e.g., amazon web services (AWS) security groups) can be updated to drop packets from the IP of the entity that have a destination outside the cloud. Embodiments are operable to configure enforcement points at the edge of a network where an entity is communicatively coupled thereto thereby controlling access of the device on a customized basis (e.g., customized or tailored for the entity).

In some embodiments, if the categorization or characteristics functionality is being updated (e.g., which could result in a change in one or more access rules that are assigned to an enforcement point closest an entity and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After confirmation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, web interface, SNMP, etc.), which are described further herein. Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor entity 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122A-B. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122A-B on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to an entity being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network entities (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other entities (e.g., ZigBee™, Bluetooth™, etc.), as described herein. The VA system, ATD system, and FW system may thus be accessed to get vulnerabilities, threats, and user information of an entity being monitored in realtime which can then be used to determine a risk level of the entity.

Aggregation device 106 may be configured to communicate with network coupled devices 122A-B and provide network access to network coupled devices 122A-B. Aggregation device 106 may further be configured to provide information (e.g., operating system, device software information, device software versions, device names, application present, running, or both, vulnerabilities, patch level, etc.) to network monitor entity 102 about the network coupled devices 122A-B. Aggregation device 106 may be a wireless access point that is configured to communicate with a wide variety of entities through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122A-B via a wireless connection. Aggregation device 106 may be configured to communicate with network coupled devices 122A-B using a standard protocol with proprietary extensions or modifications.

Aggregation device 106 may further provide log information of activity and attributes of network coupled devices 122A-B to network monitor entity 102. It is appreciated that log information may be particularly reliable for stable network environments (e.g., where the types of entities on the network do not change often). The log information may include information of updates of software of network coupled devices 122A-B.

Figure 2:
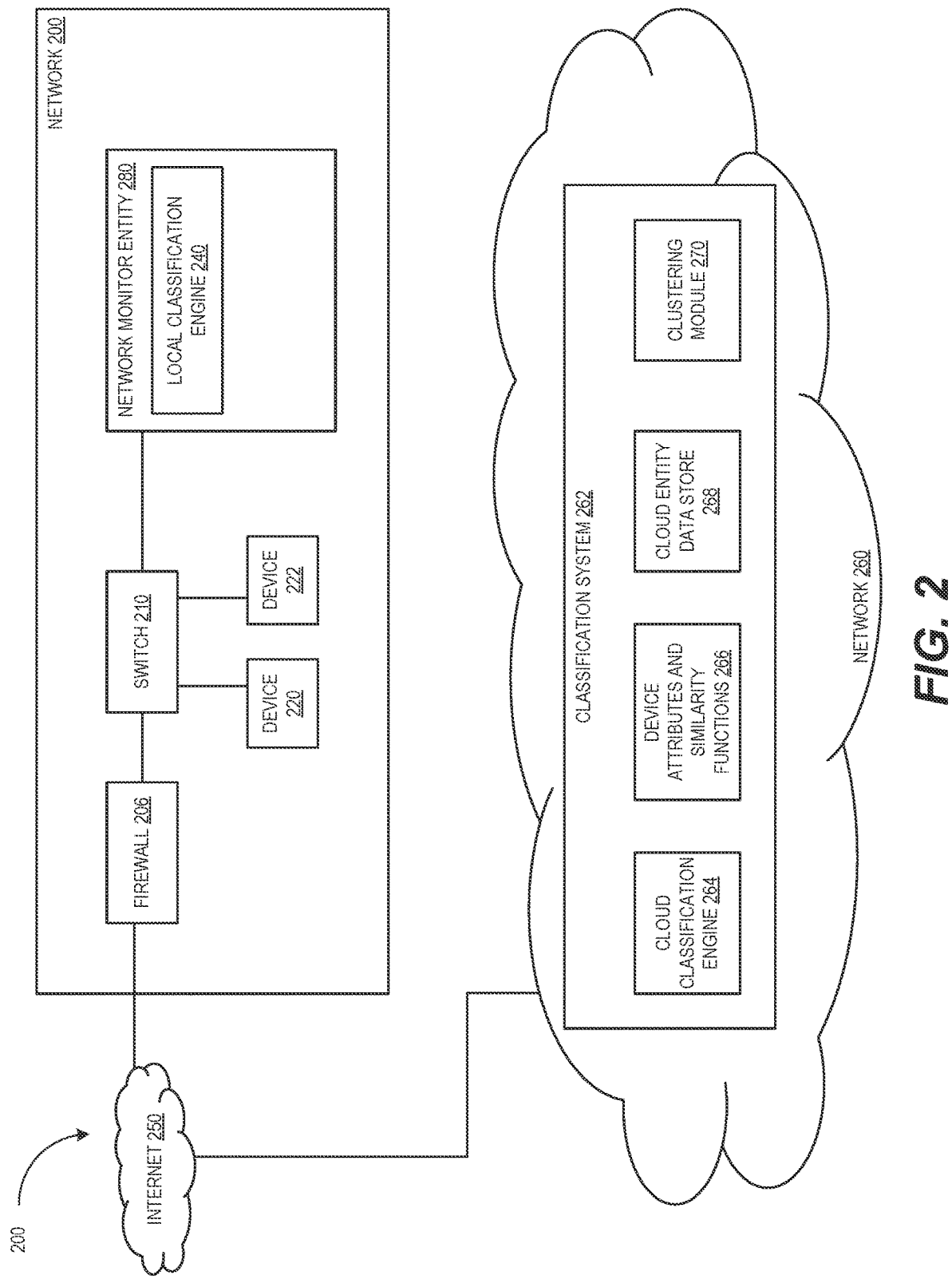
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewall 206 and switch 210) and a network monitor entity 280 (e.g., network monitor entity 102) which can perform device clustering, generate new fingerprinting rules from the device clustering, and perform or determine one or more classifications using the device clustering, as described herein, associated with the various entities communicatively coupled in example network 200.

Classification system 262 may be a cloud classification system operable to perform device clustering, generate new fingerprinting rules from the device clustering, and perform or determine one or more classifications using the device clustering, as described herein. In some embodiments, classification system 262 may be part of a larger system operable to perform a variety of functions, e.g., part of a cloud-based network monitor entity, security device, etc. Example components are shown of network monitor entity 280 and classification system 262 and other components may be present or included.

FIG. 2 shows example devices 220-222 (e.g., devices 106, 122A-B, 120, and 130, other physical or virtual devices, other entities, etc.) and it is appreciated that more or fewer network entities or other entities may be used in place of the devices of FIG. 2. Example devices 220-222 may be any of a variety of devices or entities (e.g., smart devices, multimedia devices, networking devices, accessories, mobile devices, IoT devices, retail devices, healthcare devices, etc.), as described herein. Enforcement points including firewall 206 and switch 210 may be any device (e.g., network device 104, cloud infrastructure, etc.) that is operable to allow traffic to pass, drop packets, restrict traffic, etc. Network monitor entity 280 may be any of a variety of network devices or entities, e.g., router, firewall, an access point, network access control (NAC) device, intrusion prevention system (IPS), intrusion detection system (IDS), deception device, cloud-based entity or device, virtual machine based system, etc. Network monitor entity 280 may be substantially similar to network monitor entity 102. Embodiments support IPv4, IPv6, and other addressing schemes. In some embodiments, network monitor entity 280 may be communicatively coupled with firewall 206 and switch 210 through additional individual connections (e.g., to receive or monitor network traffic through firewall 206 and switch 210).

Switch 210 communicatively couples the various entities of network 200 including firewall 206, network monitor entity 280, and devices 220-222. Firewall 206 may perform network address translation (NAT). Firewall 206 communicatively couples network 200 to Internet 250 and firewall 206 may restrict or allow access to Internet 250 based on particular rules or ACLs configured on firewall 206. Firewall 206 and switch 210 are enforcement points, as described herein.

Network monitor entity 280 can access network traffic from network 200 (e.g., via port mirroring or SPAN ports of firewall 206 and switch 210 or other methods). Network monitor entity 280 can perform passive scanning of network traffic by observing and accessing portions of packets from the network traffic of network 200. Network monitor entity 280 may perform an active scan of an entity of network 200 by sending one or more requests to the entity of network 200. The information from passive and active scans of entities of network 200 can be used to determine one or more attributes associated with the entities of network 200.

Network monitor entity 280 includes local classification engine 240 which may perform classification of the entities of network 200 including firewall 206, switch 210, and devices 220-222. Local classification engine 240 may generate fingerprinting rules and perform fingerprinting/classification (e.g., blocks of flowchart 400) of the entities of network 200 based on one or more device fingerprinting rules, or based on clusters generated by clustering module 270.

Local classification engine 240 can send data (e.g., attribute values) about entities of network 200, as determined by local classification engine 240, to classification system 262. Local classification engine 240 may encode and encrypt the data prior to sending the data to classification system 262. In some embodiments, local classification engine 240 checks the confidence and granularity of each classification and communicates with classification system 262 data to perform a classification (e.g., based on device fingerprinting rules or device clusters) where at least one of a granularity threshold or a confidence threshold are not met. Local classification engine 240 may receive a classification from classification system 262 which network monitor entity 280 can use to perform various security related measures. In some embodiments, classification of an entity may be performed in part by local network monitor entity 280 (e.g., local classification engine 240) and in part by classification system 262.

Classification system 262 can perform cloud-based clustering, fingerprinting rule generation, and device classification, as described herein. In some embodiments, classification system 262 includes cloud classification engine 264, device attributes and similarity functions 266, cloud entity data store 268, and clustering module 270.

Cloud classification engine 264 may perform clustering of devices based on device attributes, generate fingerprinting rules, and perform device classification (e.g., blocks of flowchart 400) based on data received from network monitor entity 280 (e.g., based on features determined using properties of an entity), as described herein. Cloud classification engine 264 may unencrypt and decode the information received prior to performing a classification. Cloud classification engine 264 may use cloud model data store 266 in identifying device attributes and similarity functions 266 as well as performing device clustering. The device fingerprinting rules, and/or the classifications generated by the cloud classification engine 264 can be sent back to network monitor entity 280.

Device attributes and similarity functions 266 may include the device attributes defined by a researcher, or otherwise determined by the classification system 262 or network monitor entity 280, that are to be used to perform similarity-based clustering of devices of the network 200. Device attributes and similarity functions 266 may also include the similarity functions defined to determine the similarity between values of the attributes across different devices (e.g., automatically based on clustering). Cloud profile data store 266 is not subject to the resource conditions or limitations (e.g., processing power, storage, etc.) that may impact network monitor entity 280 (e.g., and local classification engine 240). Cloud entity data store 268 is a data store (e.g., a cloud entity database) of entity information that has been uploaded to classification system 262. For example, the data in cloud entity data store 268 may include entity or device name, operating system, function, vendor/model, and host information from a variety of networks (e.g., that have network monitor entities configured to upload device information). In one example, a researcher or processing logic (e.g., machine learning model) may identify the device attributes 266 from review and analysis of the cloud entity data store 268.

Clustering module 270 may be configured to perform similarity-based semantic clustering for the devices of network 200, as described herein. For example, clustering module 270 may perform similarity functions 266 on the values of the defined device attributes 266 for the devices of the network 200 and perform a clustering algorithm based on the device similarities for each of the features. In one example, the clustering algorithm may be a hierarchical density-based spatial clustering of applications with noise (HDBSCAN) algorithm or any other density-based clustering algorithm. The cloud classification engine 264, the clustering module 270, or other components may then provide the device clusters to a researcher for review, automatically generate fingerprinting rules, or automatically classify devices of the network 200. Classifying a device may include assigning a label with a particular taxonomy, as described with respect to FIG. 7.

With reference to FIGS. 3-6, flowcharts 300-600 illustrate example operations used by various embodiments. Although specific operation blocks ("blocks") are disclosed in flowcharts 300-600, such blocks are examples. That is, embodiments are well suited to performing various other blocks or variations of the blocks recited in flowcharts 300-600. It is appreciated that the blocks in flowcharts 300-600 may be performed in an order different than presented, and that not all of the blocks in flowcharts 300-600 may be performed. The blocks of flowcharts 300-600 may be performed locally by an entity, in a cloud, or a combination thereof.

Figure 3:
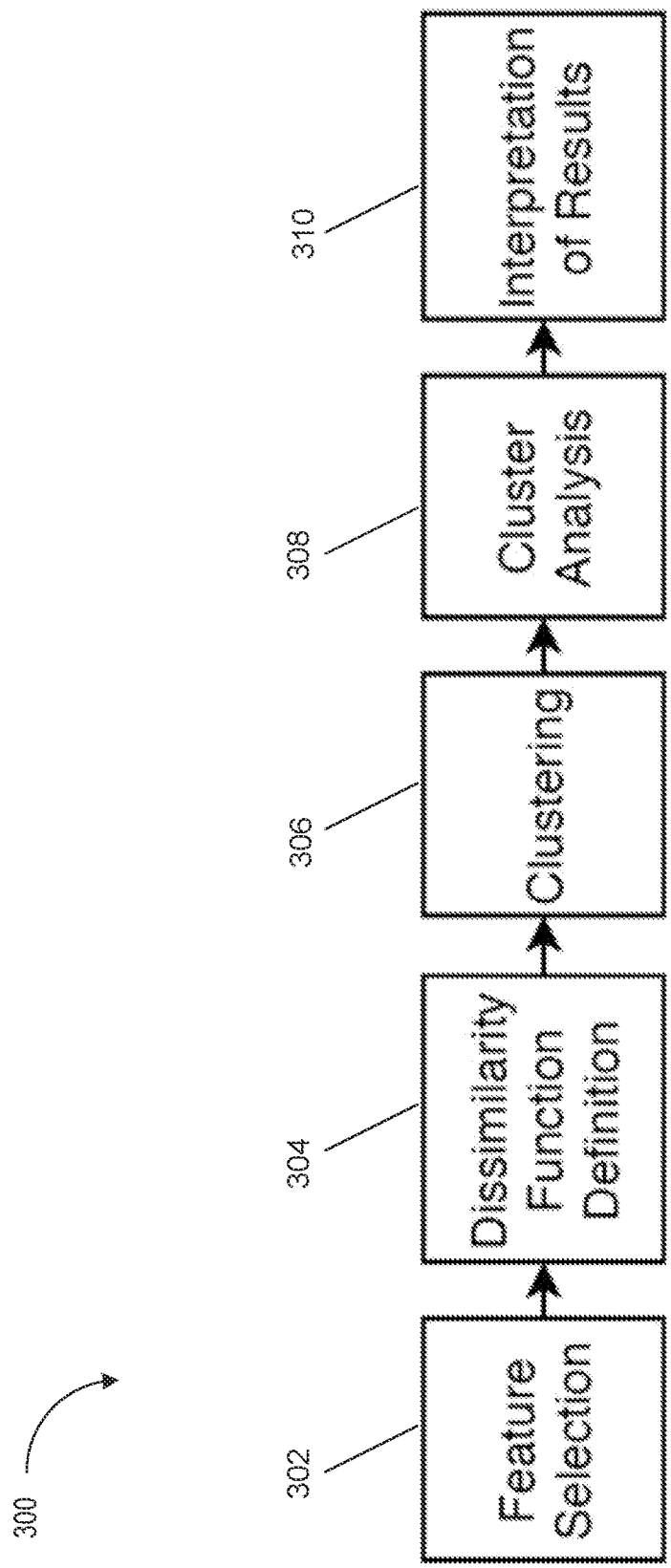
FIG. 3 depicts a flow diagram illustrating a process for device fingerprinting assisted by similarity-based semantic clustering of devices, according to embodiments of the present disclosure.

FIG. 3 depicts a flow diagram illustrating a high-level process 300 for device fingerprinting assisted by similarity-based semantic clustering of devices, according to embodiments of the present disclosure. Various portions of process 300 may be performed by different components (e.g., components of system 1400) of an entity or device (e.g., network monitor entity 102 or network monitor entity 280). Process 300 begins at block 302, where processing logic (e.g., network monitor entity 102) or a researcher may perform feature selection. Feature selection may include identifying one or more features of devices of a monitored network that may be relevant for similarity-based clustering of the devices. For example, features selection may include reviewing or accessing a device attribute database to identify features of devices that are likely to provide distinguishable and interpretable clusters of devices. Each device may be represented as a tuple of features where each feature in the tuple encompasses some attribute of the device. The selected features may be semantically meaningful features (e.g., they have meaning and are understandable by a user).

At block 304, the processing logic, or researcher, may perform dissimilarity function definition. Dissimilarity function definition may include defining a similarity function for each of the features selected at block 302. In this way, a similarity function can be selected that may be applied to the type of data for each of the different selected features. For example, a first similarity function may be defined for features with a first type of feature value (e.g., a first data type) while a second similarity function may be defined for features with a second type of feature value (e.g., a second data type), and so forth. Although referred to as a similarity function, the similarity function may also be a dissimilarity function providing the level of dissimilarity between device features. Accordingly, knowing the dissimilarity between features may also indicate the similarity between devices (e.g., if dissimilarity is low then the features are more similar).

For example, each dissimilarity function may compute the dissimilarity between two devices with respect to a single feature. A dissimilarity score of 0 may represent the highest similarity between two feature values (e.g., they are identical) and 1 may represent the lowest similarity (e.g., no similarity). The dissimilarity function may be selected based on the domain or type of a feature (e.g., string, set of strings, etc.). Examples of dissimilarity functions include the Levenshtein Index and the Jaccard index. The Levenshtein Index may compute the dissimilarity of two strings (e.g., the edit distance). The Jaccard Index may compute the dissimilarity between two sets of strings. Other dissimilarity functions may also be selected and used to calculate the dissimilarity between values of the selected features. Based on the feature vectors and a dissimilarity vector (e.g., dissimilarity for each feature), the average dissimilarity (per feature) between devices can be calculated as the sum of the dissimilarities for each feature divided by the number of features.

At block 306, the processing logic may perform clustering (e.g., similarity-based clustering) on the devices of a monitored network based on the features selected at block 302 and the dissimilarity functions defined for each feature at block 304. For example, the corresponding feature values of devices of the monitored network may be identified (e.g., via network traffic of the devices, via an agent, any other method of device information retrieval, or a combination thereof). The values for each of the devices may then be used to perform similarity-based semantic clustering on the device of the network using the similarity function for each feature defined at block 304.

In one example, clustering the devices of a network may include aggregating similar devices together while separating dissimilar ones into different clusters. In one example, density-based clustering may identify areas in a feature space with a high density of objects separated by regions of low density. Advantages of density-based clustering may include the ability to identify clusters of different sizes and shapes while also handling noise (e.g., non-clustered devices). In some embodiments, a portion of the devices of the network may already be classified, in which case the generated clusters may include both labelled and unlabeled devices. Thus, the label of the labelled devices in the cluster may be used to classify the unlabeled devices of the cluster.

At block 308, the processing logic may perform cluster analysis on the clusters resulting from the clustering at block 306. The cluster analysis may include determining a cluster score for each of the clusters, determining a similarity score for devices in the cluster for each of the features used by the clustering algorithm at 306, or any other statistical analysis of the generated clusters.

In some embodiments, the cluster score for each cluster may indicate a structural quality of the cluster. The structural quality may depend on the dissimilarity between devices of the cluster. In one example, the structural quality may be determined on a per feature basis such that if fewer than a certain number (e.g., a threshold number) of features are dissimilar then the cluster is satisfactory for further use as a fingerprinting rule or classification. A feature may be determined to be dissimilar if the average dissimilarity between the devices of the cluster for that feature is above a threshold.

At block 310, the processing logic, or a researcher, may interpret the results of the clustering 306 and the cluster analysis 308. In one example, the processing logic may provide the cluster analysis 308 to the researcher and the researcher may identify one or more fingerprinting rules for identifying devices with similar features as those that define a cluster. For example, the researcher may identify the features of a cluster that are similar and the function of the devices of the cluster to generate a rule that identifies a device as having the function when the device has the same features that are similar in the cluster. In another example, the processing logic may automatically generate fingerprinting rules for clusters that have a minimum threshold cluster score using features of the cluster that have a minimum threshold similarity score. In another example, the processing logic may automatically classify the devices in a cluster (e.g., devices that are yet to be classified) with the function of the cluster without generating fingerprinting rules.

In one example, device classification includes assigning a device type, referred to as the label of the device. The label of the device may include a taxonomy defining different levels of classification, as described with respect to FIG. 7. In some examples, a device of the network may be initially labelled (e.g., previously classified) or unlabeled (unclassified). Labelled devices may be weakly-labelled, meaning that only high level information (e.g., low granularity) is known about the device. Classification of weakly-labelled devices may be improved via better device fingerprinting rules or clustering based classification. Thus, according to embodiments, performing fingerprinting of devices using similarity-based device clustering may improve the coverage of well-labelled devices, the granularity (level of labels of devices) of classification, and the accuracy (percentage of correctly labelled devices).

Figure 4:
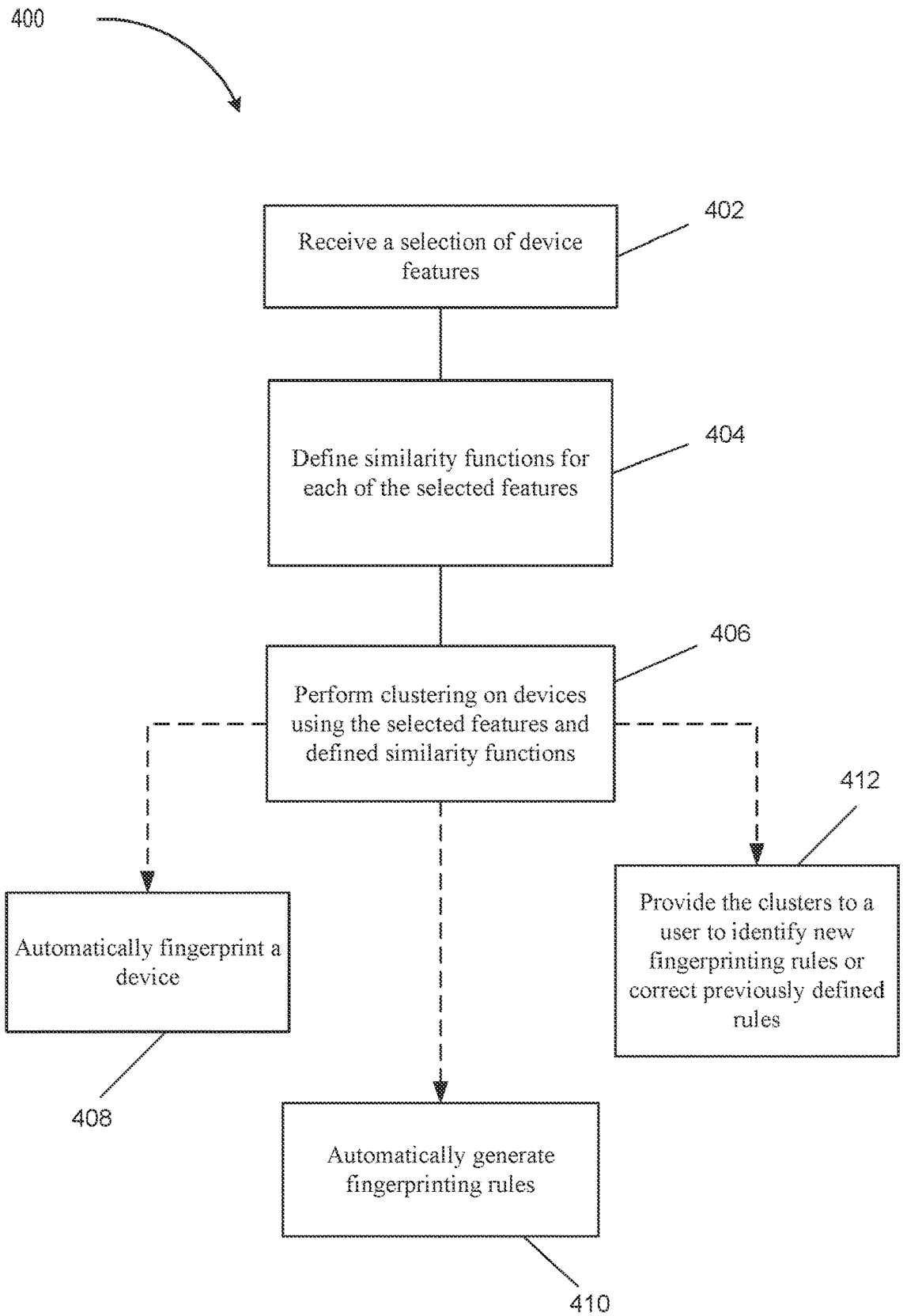
FIG. 4 depicts a flow diagram illustrating another process for device fingerprinting assisted by similarity-based semantic clustering of devices, according to embodiments of the present disclosure.

FIG. 4 depicts a flow diagram of aspects of process 400 for similarity-based clustering assisted device fingerprinting and classification in accordance with one implementation of the present disclosure. Various portions of process 400 may be performed by different components (e.g., components of system 1400) of an entity or device (e.g., network monitor entity 102 or network monitor entity 280). Process 400 begins at block 402, where processing logic (e.g., network monitor entity 102 or network monitor entity 280) accesses a selection of device features to be used for semantic-based clustering, as described above with respect to block 302 of FIG. 3. At block 404, the processing logic accesses a definition of similarity functions for each of the selected features, as described above with respect to block 304 of FIG. 3. At block 406, the processing logic performs clustering of devices of a monitored network using the selected features and the defined similarity functions, as described above with respect to block 306 of FIG. 3.

After the clustering of devices has been performed at block 406, depending on the embodiment, the processing logic may proceed to blocks 408, 410, or 412. In one embodiment, at block 408, the processing logic may automatically fingerprint and classify any devices in the monitored network that have yet to be fingerprinted without generating a fingerprinting rule. Because each device in the monitored network is classified based on the clusters rather than fingerprinting rules, generating fingerprinting rules for a rules database may be unnecessary. The processing logic may perform the clustering 406 and classify each device in the network periodically, upon addition of or communicative coupling of a new device to the monitored network, or a combination of such.

In one embodiment, at block 410, the processing logic automatically generates one or more fingerprinting rules to be added to a rules database for future fingerprinting of new devices, unclassified devices, or misclassified devices, or for more granularity fingerprinting devices that have previously been classified only at a high level (e.g., low granularity). In one embodiment, at block 412, the processing logic provides the clusters to a user (e.g., a researcher) for the user to identify new fingerprinting rules or correct previously defined rules.

Figure 5:
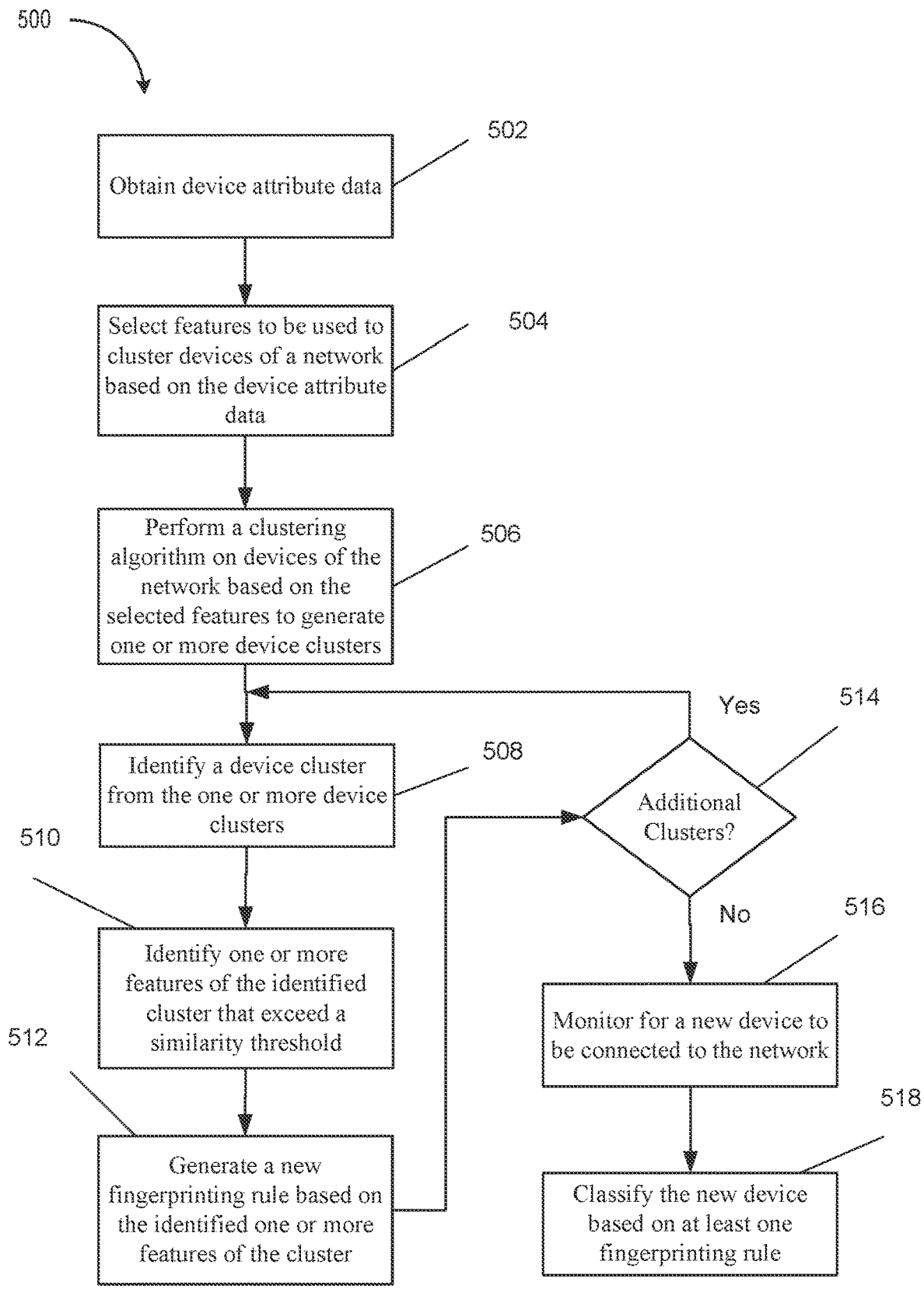
FIG. 5 depicts a flow diagram illustrating another process for device fingerprinting assisted by similarity-based semantic clustering of devices, according to embodiments of the present disclosure.

FIG. 5 depicts a flow diagram of process 500 for similarity-based clustering assisted device fingerprinting and classification in accordance with one implementation of the present disclosure. Various portions of process 500 may be performed by different components (e.g., components of system 1400) of an entity (e.g., network monitor entity 102 or network monitor entity 280). Blocks of process 500 may be performed by a network monitoring entity (e.g., network monitor entities 102 or 280) or classification system 262. Process 500 begins at block 502, where processing logic obtains device attribute data that has been collected for network coupled devices. For example, the processing logic may obtain a device attribute database including features associated with several different types of connected devices.

At block 504, the processing logic receives a selection of features to be used to cluster devices based on the device attribute data (e.g., as described with respect to block 302 of FIG. 3 and block 402 of FIG. 4). At block 506, the processing logic performs a clustering algorithm on devices of the network based on the selected features to generate one or more device clusters (e.g., as described with respect to block 306 of FIG. 3 and block 404 of FIG. 4). At block 508, the processing logic identifies a device cluster from the one or more device clusters (e.g., as described with respect to block 308 of FIG. 3). At block 510, the processing logic identifies one or more features of the identified cluster that exceed a similarity threshold (e.g., as described with respect to block 308 of FIG. 3). At block 512, the processing logic generates a new fingerprinting rule based on the identified one or more features of the cluster (e.g., as described with respect to blocks 410 or 412 of FIG. 4). At block 514, the processing logic determines whether there are additional clusters to be analyzed. In response to determining that there are additional clusters to analyze, the processing logic may return to block 508 and perform each of blocks 508-514 again. In response to determining that there are no additional clusters to analyze, the processing logic proceeds to block 516, where the processing logic monitors the network for a new device to be connected to the network. At block 518, the processing logic fingerprints and classifies the new device based on at least one of the fingerprinting rules generated at block 512.

Figure 6:
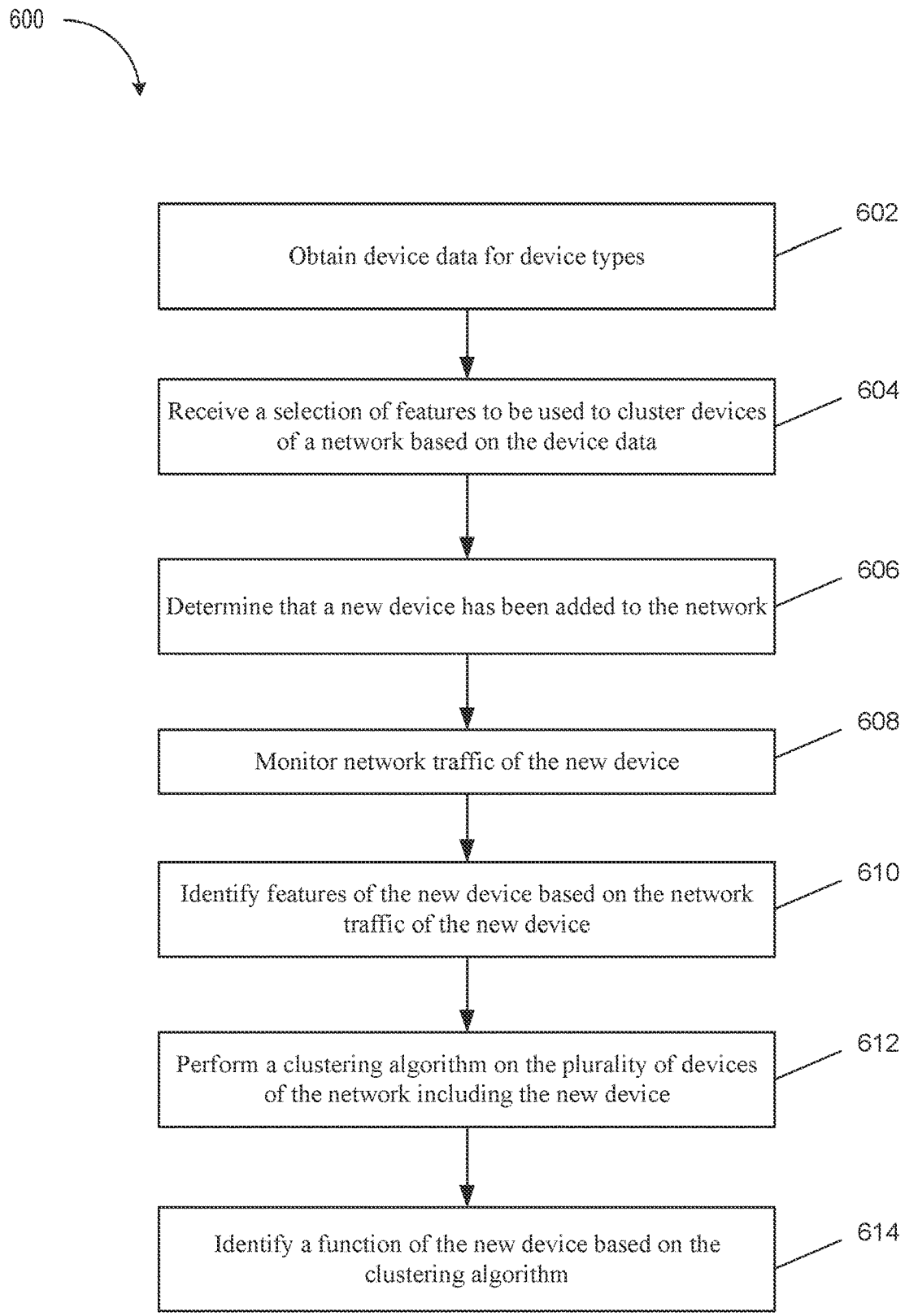
FIG. 6 depicts a flow diagram illustrating another process for device fingerprinting assisted by similarity-based semantic clustering of devices, according to embodiments of the present disclosure.

FIG. 6 depicts a flow diagram of process 600 for similarity-based clustering assisted device fingerprinting and classification for classification in accordance with one implementation of the present disclosure. Various portions of process 600 may be performed by different components (e.g., components of system 1400) of an entity (e.g., network monitor entity 102 or network monitor entity 280). Blocks of process 600 may be performed by a network monitoring entity (e.g., network monitor entities 102 or 280) or classification system 262. Process 600 begins at block 602, where processing logic obtains device data for a plurality of device types (e.g., as described with respect to block 302 of FIG. 3 and block 402 of FIG. 4).

At block 604, the processing logic receives a selection of features to be used to cluster devices of a network based on the device data (e.g., as described with respect to block 302 of FIG. 3 and block 402 of FIG. 4). At block 606, the processing logic determines that a new device has been added or communicatively coupled to the network. At block 608, the processing logic monitors and obtains network traffic of the new device. At block 610, the processing logic identifies features of the new device based on the network traffic of the new device. At block 612, the processing logic performs a clustering algorithm on a plurality of devices of the network including the new device (e.g., as described with respect to block 306 of FIG. 3 and block 404 of FIG. 4). At block 614, the processing logic identifies a function of the new device based on the clustering algorithm (e.g., as described with respect to block 408 of FIG. 4).

Figure 7:
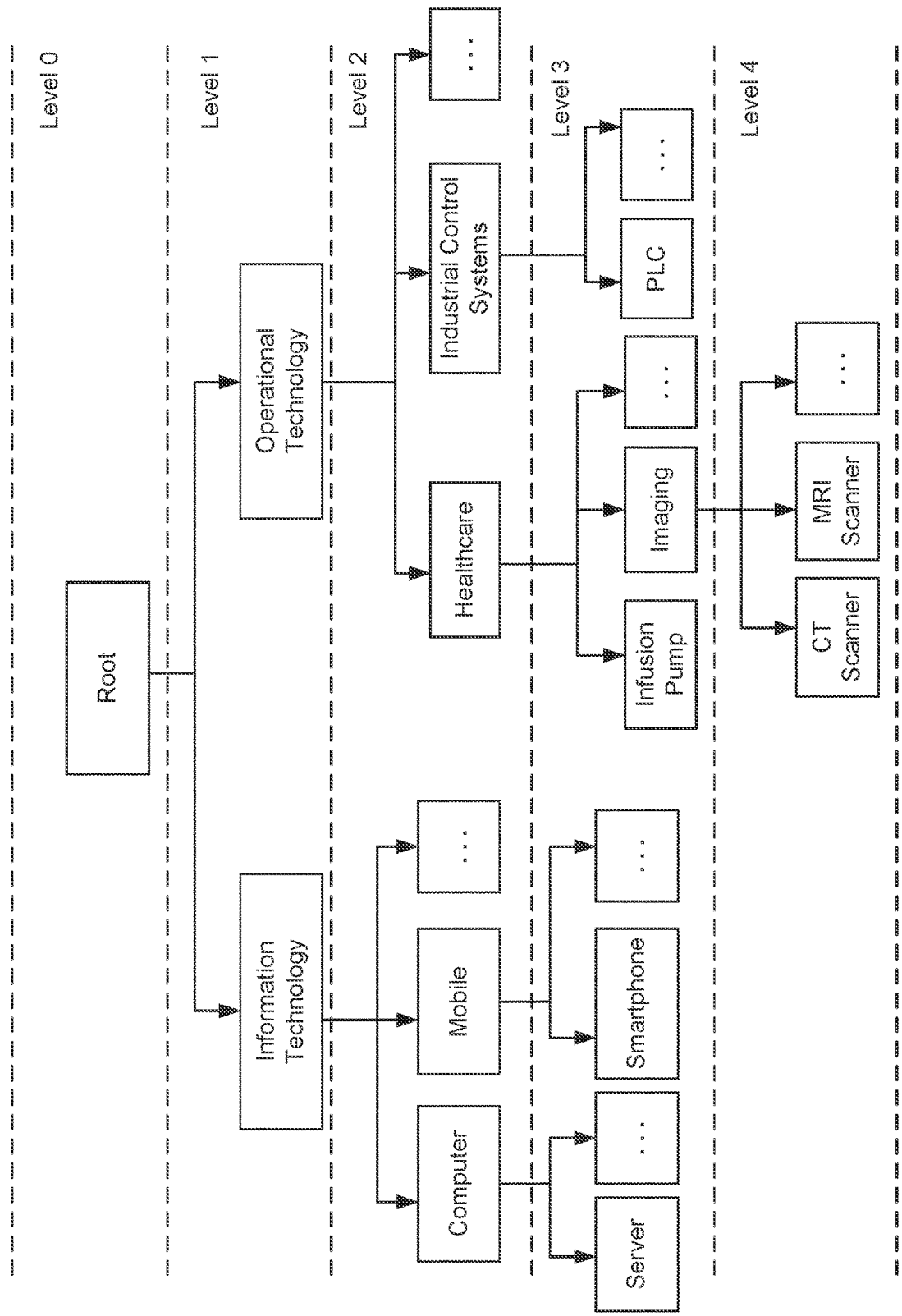
FIG. 7 depicts an example device classification taxonomy illustrated as a directed tree, according to embodiments of the present disclosure.

FIG. 7 illustrates an example device classification taxonomy depicted as a directed tree. The device classification taxonomy may be represented by a sequence of string labels from the root to the highest level classification. The level of a node corresponds to the depth of the node in the tree, e.g., the length of the path to the root. In some examples, a specific node, representing a device label, may be denoted by the sequence of labels from the root. For example, a label of "/IT/Networking/Router" denotes a router. Additionally, in some examples, the level of a device is the level of its label (e.g., a device that has the label "/OT/ICS/PLC" is a level 3 labelled device). A device may be referred to as unlabeled if its level is 0. Alternatively, a device may be referred to as labelled if it is labelled at level 1 or higher. Depending on its highest classification level, a labelled device can be qualified as weakly-labelled (the level is 1) or well-labelled (the level is at least 2). In the taxonomy, a level 0 label gives no information about a device, and a level 1 label gives very limited information. Hence devices with a label of level 0 or 1 (e.g., unlabeled and weakly-labelled devices) may be referred to as to-be-classified devices. The quality, or fitness, of a device classification function is measured in terms of coverage (percentage of well-labelled devices), granularity (the levels of the devices), and accuracy (percentage of correctly labelled devices compared to some ground truth).

FIG. 8 an example feature set selected for similarity-based semantic clustering to classify devices of a network according to embodiments of the present disclosure. As depicted, the set of selected features may be semantically meaningful to a user or processing logic and may each be associated with a value type (e.g., string, set of strings, etc.). Additionally, the source of each of the features (e.g., how each of the features is obtained and determined) may be included. Furthermore, as depicted, a similarity function may be defined for each of the selected features (e.g., the Levenshtein index or the Jaccard index). The features may be obtained from sources such as DHCP, HTTP messages, MAC of device, an Nmap or pOf scan, any other source associated with a network device, or combination thereof.

FIG. 9 an example feature set selected for similarity-based semantic clustering to classify devices of a network according to embodiments of the present disclosure. FIG. 9 includes a similar feature set as FIG. 8 but with an additional description of each of the features and an indication of the value type. The value type of the feature may be useful for determining the similarity function for each feature. The description may provide context after performing a clustering algorithm for why certain devices were clustered together (e.g., features with higher similarity scores may be indicated).

FIG. 10 illustrates a pair-wise similarity matrix of multiple devices and open ports of the devices according to embodiments of the disclosure. Based on the value types of the selected features (strings and sets of strings), a researcher may select similarity functions (e.g., the Levenshtein Index, the Jaccard Index, or any other similarity function). The Levenshtein Index, also referred to as edit distance, computes the minimal number of insertions, deletions, and substitutions to make two strings the same. It allows comparison of two strings of arbitrary length, thus it is suited to measure the distance between feature values of string type. The Jaccard Index measures the similarity between two sets of strings A and B as the cardinality of the intersection divided by the cardinality of the union of the sets, as represented by the following equation:

$$J(A, B) = \frac{|A \cap B|}{|A \cup B|}$$

The Jaccard Index is well-suited for features whose values are sets of strings. The network monitor device may implement a similarity function for those features that first transforms the set of strings into two sets of tokens and then computes the Jaccard Index. For each feature, its similarity function may be used to compute a pair-wise similarity matrix, as shown in FIG. 10.

FIG. 11 depicts a featurized data set for multiple monitored devices coupled to a monitored network according to embodiments of the disclosure. The devices found on a monitored network may comprise a wide variety of device types, ranging from traditional computers and servers to IoT devices, such as IP cameras. On some networks, industry specific devices can also be found, such as patient monitors and other connected medical devices in hospitals. Within the network, device data may be captured by passively monitoring device communications with network monitoring tools such as pOf and by actively scanning the devices (e.g., with Nmap or other tools). The captured device data is fed to a classification engine, which assigns a unique ID to each device and applies a set of fingerprints against the captured device data to assign a label to each device.

To create a dataset for the monitored devices to be used for similarity-based clustering, a network monitor entity (e.g., network monitor entity 102) may extract and store the devices and respective data as a collection of key-value pairs in a formatted file (e.g., a JSON file, XML file, etc.). Each device may be represented as a tuple consisting of its unique ID, its label (if found by the classification engine, otherwise "Unknown") and its values for features selected to be used for similarity-based clustering (e.g., features depicted in FIG. 8 or FIG. 9).

FIG. 12 illustrates an example cluster according to embodiments of the present disclosure. As depicted, the reasons for a cluster may also be provided by presenting the features of a cluster with a high similarity score (e.g., above a threshold value). The results may also provide the similarity scores for each of the selected features as well as an overall cluster score (e.g., an indication of the overall similarity and thus the quality of the cluster). The results may also provide a list of the functions (e.g., the labels) of the devices in the cluster, which may be useful in determining if devices have been previously misclassified or need to be classified.

According to one example, FIG. 12 illustrates an example cluster with 58 similar devices where 7 may be classified as computers and 51 may not classified (unknown). All devices may share a value of "Windows Machine" for the "va_netfunc" feature, which indicates that they may each be a Windows computer. The devices may also share the value "Linksys BEFW1154 WAP" for feature "nmap_netfunc7", but this feature may be less reliable than "va_netfunc" based on its source.

FIG. 13 illustrates another example cluster according to embodiments of the present disclosure. According to one example, FIG. 13 illustrates an example cluster with 178 similar devices, 7 of which are misclassified as mobile and 4 of which are unclassified, where all devices should have been classified as computers based on the same rule as FIG. 12.

Figure 14:
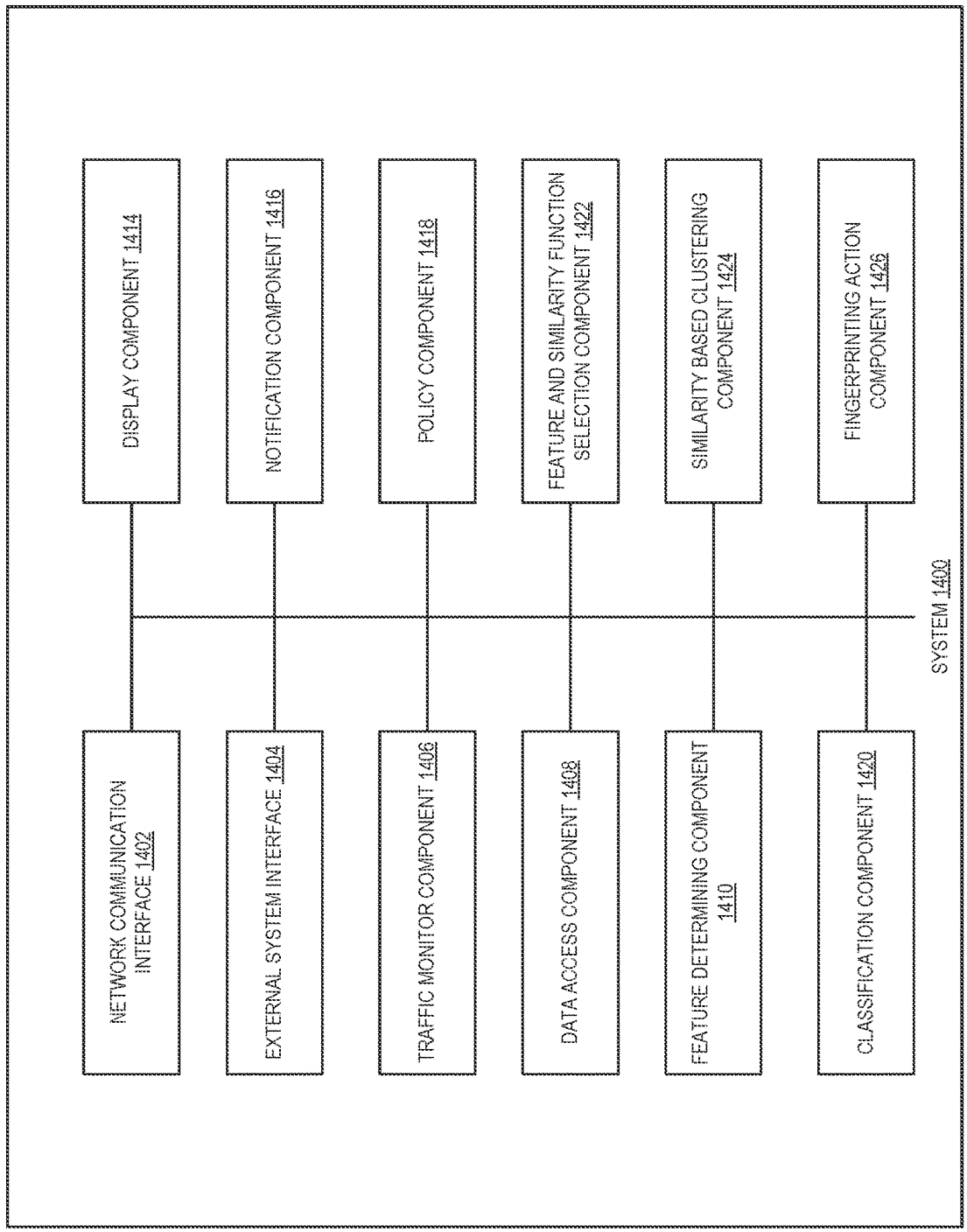
FIG. 14 depicts illustrative components of a system for similarity-based semantic clustering assisted device fingerprinting in accordance with one implementation of the present disclosure.

FIG. 14 illustrates example components used by various embodiments. Although specific components are disclosed in system 1400, it should be appreciated that such components are examples. That is, embodiments are well suited to having various other components or variations of the components recited in system 1400. It is appreciated that the components in system 1400 may operate with other components than those presented, and that not all of the components of system 1400 may be required to achieve the goals of system 1400.

FIG. 14 depicts illustrative components of a system for perform clustering of devices based on device attributes, generate fingerprinting rules, perform device classification, or a combination thereof in accordance with one implementation of the present disclosure. Example system 1400 or classifier 1400 includes a network communication interface 1402, an external system interface 1404, a traffic monitor component 1406, a data access component 1408, a feature determination component 1410, a display component 1414, a notification component 1416, a policy component 1418, a classification component 1420, a feature and similarity function selection component 1422, a similarity-based clustering component 1424, and a fingerprinting action component 1426. The components of system 1400 may be part of a computing system or other electronic device (e.g., network monitor entity 102 or network monitor entity 280) or a virtual machine or device and be operable to monitor and one or more entities communicatively coupled to a network, monitor network traffic, determine one or more classifications of an entity, perform one or more actions, as described herein. For example, the system 1400 may further include a memory and a processing device, operatively coupled to the memory, which may perform the operations of or execute the components of system 1400. The components of system 1400 may access various data and characteristics or properties associated with an entity (e.g., network communication information) and data associated with one or more entities. It is appreciated that the modular nature of system 1400 may allow the components to be independent and allow flexibility to enable or disable individual components or to extend, upgrade, or combination thereof components without affecting other components thereby providing scalability and extensibility. System 1400 may perform one or more blocks of flow diagrams 300-600. In some embodiments the components of 1400 may be part of network monitor device (e.g., network monitor entities 102 and 280), in the cloud, or the various components may be distributed between local and cloud resources.

Communication interface 1402 is operable to communicate with one or more entities (e.g., network device 104, firewall 206, switch 210, other entities coupled thereto, devices 220-222, etc.) coupled to a network that are coupled to system 1400 and receive or access information about entities (e.g., device information, device communications, device characteristics, properties, etc.), access information as part of a passive scan, send one or more requests as part of an active scan, receive active scan results or responses (e.g., responses to requests), as described herein. The communication interface 1402 may be operable to work with one or more components to initiate access to characteristics or determination of characteristics of an entity to allow determination of one or more properties which may then be used for device compliance, asset management, standards compliance, classification, identification, etc., as described herein. Communication interface 1402 may be used to receive and store network traffic for determining properties, as described herein.

External system interface 1404 is operable to communicate with one or more third party, remote, or external systems to access information including characteristics or properties about an entity (e.g., to be used to determine a security aspects). External system interface 1404 may further store the accessed information in a data store. For example, external system interface 1404 may access information from a vulnerability assessment (VA) system to enable determination of one or more compliance or risk characteristics associated with the entity. External system interface 1404 may be operable to communicate with a vulnerability assessment (VA) system, an advanced threat detection (ATD) system, a mobile device management (MDM) system, a firewall (FW) system, a switch system, an access point (AP) system, etc. External system interface 1404 may query a third party system using an API or CLI. For example, external system interface 1404 may query a firewall or a switch for information (e.g., network session information) about an entity or for a list of entities that are communicatively coupled to the firewall or switch and communications associated therewith. In some embodiments, external system interface 1404 may query a switch, a firewall, or other system for information of communications associated with an entity.

Traffic monitor component 1406 is operable to monitor network traffic to determine if a new entity has joined the network or an entity has rejoined the network and monitor traffic for analysis by data access component 1408, classification component 1420, and model training component 1422, as described herein. Traffic monitor component 1406 may have a packet engine operable to access packets of network traffic (e.g., passively) and analyze the network traffic. The traffic monitor component 1406 may further be able to access and analyze traffic logs from one or more entities (e.g., network device 104, system 150, or aggregation device 106) or from an entity being monitored. The traffic monitor component 1406 may further be able to access traffic analysis data associated with an entity being monitored, e.g., where the traffic analysis is performed by a third-party system.

Data access component 1408 may be operable for accessing data including metadata associated with one or more network monitoring entities (e.g., network monitor entities 102 or 280-282), including properties that the network monitoring entity is monitoring or collecting, software versions (e.g., of the profile library of the network monitoring entity), and the internal configuration of the network monitoring entity. The data accessed by data access component 1408 may be used by embodiments to perform classification including ensuring that the most up to date models, profiles, and other classification information is being used (e.g., by classification component 1420). Data access component 1408 may further access vertical or environment data and other user associated data, including vertical, environment, common type of entities for the network or network portions, segments, areas with classification issues, etc., which may be used for classification.

Data access component 1408 may access data associated with active or passive traffic analysis or scans or a combination thereof. Data access component may further be able to access and analyze traffic logs from one or more entities (e.g., network device 104, system 150, or aggregation device 106) or from an entity being monitored. Data access component 1408 may further be able to access traffic analysis data associated with an entity being monitored, e.g., where the traffic analysis is performed by a third-party system. Information accessed by data access component 1408 may be stored, displayed, and used as a basis for device feature selection, similarity function selection, fingerprint rule determination, automatically generate fingerprinting rules, or automatically classify devices, etc., as described herein.

Feature determination component 1410 is configured to determine one or more features associated with an entity, as described herein. Feature determination component 1410 may determine one or more features and associated values associated with an entity based on analysis (e.g., including extraction of properties and values) of network traffic, as described herein. In some examples, as described herein, device features may be the same or similar to device attributes. In other examples, a device attribute may be general attributes of a class or classes of devices while device features may be the particular values for attributes of individual devices, or entities. The features can then be stored and used by other components (e.g., classification component 1420, feature and similarity function selection component 1422, or similarity-based clustering component 1424) for device feature selection, similarity function selection, fingerprint rule determination, automatically generation of fingerprinting rules, or automatic classification of devices, as described herein.

Classification component 620 is configured to determine one or more classifications, e.g., based on fingerprinting rules or device clusters, as described herein. Classification component 620 may further use profile libraries, entity or device fingerprints, etc., in conjunction or in place of classification using the one or more models, as described herein. Classification component 620 may use local resources (e.g., local classification engine 240), cloud resources (e.g., classification system 262), or a combination thereof for determining a classification.

Feature and similarity function selection component 1422 may be configured to receive a selection of one or more device features to be used for performing clustering of devices, as described herein. Feature and similarity function selection component 1422 may further be configured to receive a selection or determination of a similarity (or dissimilarity function) for each of the one or more device features for performing similarity-based device clustering, as described herein.

Similarity-based clustering component 1424 is configured to perform a clustering algorithm on the devices of a network using the selected features and similarity functions, as described herein. The similarity-based clustering component 1424 may use the features of the devices identified for each device by the feature determining component 1410 to perform the clustering algorithm, as described herein.

Fingerprinting action component 1426 is configured to perform one or more actions in view of the device clusters, as described herein. The fingerprinting action component 1426 may provide the clusters to a user for fingerprint rule determination, automatically generate fingerprinting rules, or automatically classify devices of the network based on the clusters, as described herein.

Display component 1414 is configured to optionally display one or more graphical user interfaces or other interfaces (e.g., command line interface) for depicting various information associated with entities, classification, thresholds (e.g., confidence thresholds), and models, as described herein. In some embodiments, display component 1414 may display or render a hierarchy of models (e.g., tree 300), a network graph of entities including one or more classifications, access rules associated with entities, and other access rule information (e.g., access policies, access templates, etc.).

Notification component 1416 is operable to initiate one or more notifications based on the results of one or more classifications and other analysis of communications, as described herein. The notification may be any of a variety of notifications, e.g., IT ticket, email, SMS, a HTTP notification, etc., as described herein.

Policy component 1418 is operable for initiating or triggering one or more remediation actions or security actions according to one or more policies, e.g., based on one or more classifications, as described herein. Policy component 1418 may further be configured to perform other operations including checking compliance status, finding open ports, etc. In some embodiments, policy component 1418 may verify that an assignment of one or more access rules to one or more enforcements points has been properly assigned or configured. Policy component 1418 may restrict network access, signal a patch system or service, signal an update system or service, etc., as described herein. The policy component 1418 may thus, among other things, invoke automatically (e.g., without user or human interaction) patching, automatically updating, and automatically restrict network access of an entity (e.g., that has out-of-date software or based on access rule violation or attempted violation).

The actions may include restricting network access to a particular level (e.g., full, limited, or no network access, for instance via an enforcement point), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 1400 may be software stored on a non-transitory computer readable medium having instructions encoded thereon that, when executed by a processing device, cause the processing device to access entity attribute data associated with network entities and determine one or more entity attributes for classifying a plurality of entities based on the entity attribute data. The instructions may further cause the processing device to monitor a plurality of entities coupled to a network, identify values for the one or more entity attributes for the plurality of entities, and cluster, by the processing device, the plurality of entities into one or more entity clusters based on a similarity of the values of the one or more entity attributes for the plurality of entities. The instructions may then cause the processing device to perform an entity fingerprinting action based on the entity clusters.

In some embodiments, to perform the entity fingerprinting action, the processing device may provide the entity clusters for manual rule generation. In one embodiment, to perform the entity fingerprinting action, the processing device may provide one or more fingerprinting rule recommendations based on the entity clusters. In one embodiment, to perform the entity fingerprinting action, the processing device may automatically fingerprint at least one entity of the plurality of entities coupled to the network based on the entity clusters.

In one embodiment, the processing device may further determine a similarity function for each of the one or more entity attributes, wherein the similarity function determines the similarity of a corresponding entity attribute between entities. In one embodiment, to cluster the plurality of entities into the one or more entity clusters based on the similarity of the one or more entity attributes, the processing device may determine a similarity of each of the one or more entity attributes across the plurality of entities coupled to the network and identify the one or more entity clusters based on the similarity of each of the one or more entity attributes.

Figure 15:
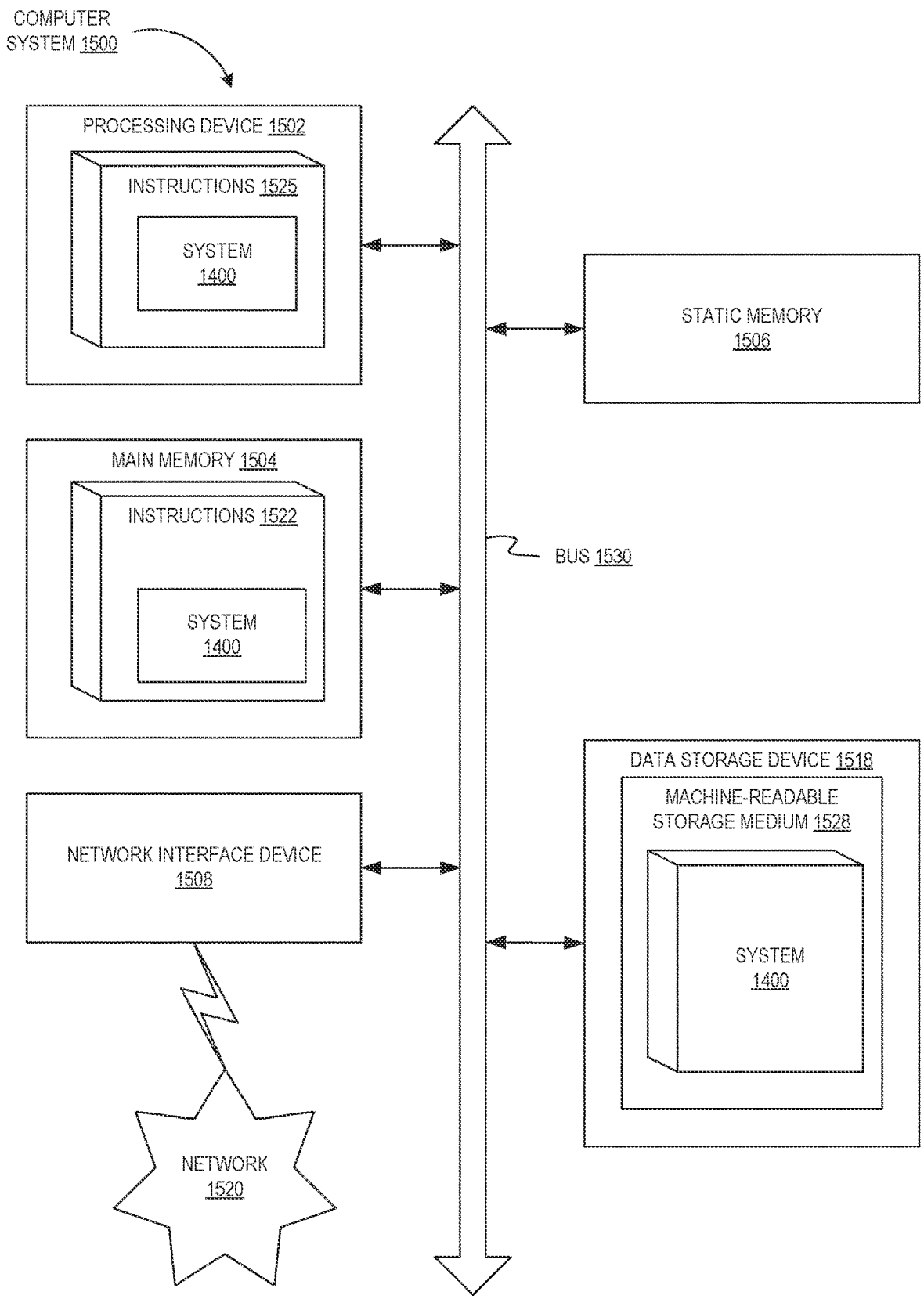
FIG. 15 is a block diagram illustrating an example computer system, in accordance with one implementation of the present disclosure.

FIG. 15 is a block diagram illustrating an example computer system, in accordance with one implementation of the present disclosure. FIG. 15 illustrates a diagrammatic representation of a machine in the example form of a computer system 1500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1500 may be representative of a server, such as network monitor entity 102 running system 1400 to perform device feature selection, similarity function selection, fingerprint rule determination, automatically generation of fingerprinting rules, or automatic classification of devices, as described herein.

The exemplary computer system 1500 includes a processing device 1502, a main memory 1504 (e.g., read-only memory (ROM), flash memory, dynamic random access memory (DRAM), a static memory 1506 (e.g., flash memory, static random access memory (SRAM), etc.), and a data storage device 1518, which communicate with each other via a bus 1530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 is configured to execute processing logic 1526, which may be one example of system 1400 shown in FIG. 14, for performing the operations and steps discussed herein.

The data storage device 1518 may include a machine-readable storage medium 1528, on which is stored one or more set of instructions 1522 (e.g., software) embodying any one or more of the methodologies of operations described herein, including instructions to cause the processing device 1502 to execute system 1400. The instructions 1522 may also reside, completely or at least partially, within the main memory 1504 or within the processing device 1502 during execution thereof by the computer system 1500; the main memory 1504 and the processing device 1502 also constituting machine-readable storage media. The instructions 1522 may further be transmitted or received over a network 1520 via the network interface device 1508.

The machine-readable storage medium 1528 may also be used to store instructions to perform a method of clustering of devices based on device attributes, generating fingerprinting rules, and perform device classification, as described herein. While the machine-readable storage medium 1528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   determining a plurality of entity attributes for entity classification;
   monitoring a plurality of entities coupled to a network;
   identifying values for each entity attribute of the plurality of entity attributes for the plurality of entities, wherein each value has a corresponding type such that at least two values have different types;
   determining a semantic similarity, between the plurality of entities, of the values for each entity attribute based on a plurality of preconfigured similarity functions where each similarity function in the plurality of preconfigured similarity functions corresponds to a different type of a value in the values for each entity attribute;
   clustering, by a processing device, the plurality of entities into a plurality of entity clusters based on the semantic similarity of the values for each of the plurality of entity attributes for the plurality of entities; and
   identifying, based on the clustering, one or more features of at least the plurality of entity clusters that exceed a similarity threshold for generating a new fingerprinting rule.

2. The method of claim 1, wherein the clustering is performed based on an aggregate of the semantic similarity of the values for each entity attribute between the plurality of entities.

3. The method of claim 1, further comprising:
   in response to the clustering the plurality of entities, performing an entity fingerprinting action on one or more entities included in a first cluster of the plurality of entity clusters based on at least one entity attribute of the first cluster, wherein the entity fingerprinting action is associated with classifying the one or more entities included in the first cluster.

4. The method of claim 3, wherein performing the entity fingerprinting action comprises:
   providing the plurality of entity clusters for manual rule generation.

5. The method of claim 3, wherein performing the entity fingerprinting action comprises:
   determining one or more fingerprinting rule recommendations based on the plurality of entity clusters.

6. The method of claim 3, wherein performing the entity fingerprinting action comprises:
   automatically fingerprinting at least one entity of the plurality of entities coupled to the network based on the plurality of entity clusters.

7. The method of claim 1, wherein clustering the plurality of entities into the plurality of entity clusters comprises performing density-based clustering of the plurality of entities based on one or more entity attributes associated with each entity of the plurality of entities.

8. A system comprising:
a memory; and
a processing device, operatively coupled to the memory, to:
- determine a plurality of entity attributes for entity classification;
- monitor a plurality of entities coupled to a network;
- identify values for each entity attribute of the plurality of entity attributes for the plurality of entities, wherein each value has a corresponding type such that at least two values have different types;
- determine a semantic similarity, between the plurality of entities, of the values for each entity attribute based on a plurality of preconfigured similarity functions where each similarity function in the plurality of preconfigured similarity functions corresponds to a different type of a value in the values for each entity attribute;
- cluster the plurality of entities into a plurality of entity clusters based on the semantic similarity of the values for each of the plurality of entity attributes for the plurality of entities; and
- identify, based on the clustering, one or more features of at least the plurality of entity clusters that exceed a similarity threshold for generating a new fingerprinting rule.

9. The system of claim 8, wherein to perform the clustering, the processing device is to perform the clustering based on an aggregate of the semantic similarity of the values for each entity attribute between the plurality of entities.

10. The system of claim 8, wherein the processing device is further to:
- in response to the clustering the plurality of entities, perform an entity fingerprinting action on one or more entities included in a first cluster of the plurality of entity clusters based on at least one entity attribute of the first cluster, wherein the entity fingerprinting action is associated with classifying the one or more entities included in the first cluster.

11. The system of claim 10, wherein to perform the entity fingerprinting action, the processing device is to:
- provide the plurality of entity clusters for manual rule generation.

12. The system of claim 10, wherein to perform the entity fingerprinting action, the processing device is to:
- determine one or more fingerprinting rule recommendations based on the plurality of entity clusters.

13. The system of claim 10, wherein to perform the entity fingerprinting action, the processing device is to:
- automatically fingerprint at least one entity of the plurality of entities coupled to the network based on the plurality of entity clusters.

14. The system of claim 8, wherein to cluster the plurality of entities into the plurality of entity clusters, the processing device is to perform density-based clustering of the plurality of entities based on one or more entity attributes associated with each entity of the plurality of entities.

15. A non-transitory computer readable medium having instructions encoded thereon that, when executed by a processing device, cause the processing device to:
- determine a plurality of entity attributes for entity classification;
- monitor a plurality of entities coupled to a network;
- identify values for each entity attribute of the plurality of entity attributes for the plurality of entities, wherein each value has a corresponding type such that at least two values have different types;
- determine a semantic similarity, between the plurality of entities, of the values for each entity attribute based on a plurality of preconfigured similarity functions where each similarity function in the plurality of preconfigured similarity functions corresponds to a different type of a value in the values for each entity attribute;
- cluster, by the processing device, the plurality of entities into a plurality of entity clusters based on the semantic similarity of the values for each of the plurality of entity attributes for the plurality of entities; and
- identify, based on the clustering, one or more features of at least the plurality of entity clusters that exceed a similarity threshold for generating a new fingerprinting rule.

16. The non-transitory computer readable medium of claim 15, wherein to cluster the plurality of entities, the instructions, when executed by the processing device, cause the processing device to perform the clustering based on an aggregate of the semantic similarity of the values for each entity attribute between the plurality of entities.

17. The non-transitory computer readable medium of claim 15, wherein the instructions, when executed by the processing device, cause the processing device further to:
- in response to clustering the plurality of entities, perform an entity fingerprinting action on one or more entities included in a first cluster of the plurality of entity clusters based on at least one entity attribute of the first cluster, wherein the entity fingerprinting action is associated with classifying the one or more entities included in the first cluster.

18. The non-transitory computer readable medium of claim 17, wherein to perform the entity fingerprinting action, the instructions, when executed by the processing device, cause the processing device to:
- provide the plurality of entity clusters for manual rule generation.

19. The non-transitory computer readable medium of claim 17, wherein to perform the entity fingerprinting action, the instructions, when executed by the processing device, cause the processing device to:
- determine one or more fingerprinting rule recommendations based on the plurality of entity clusters.

20. The non-transitory computer readable medium of claim 17, wherein to perform the entity fingerprinting action, the instructions, when executed by the processing device, cause the processing device to:
- automatically fingerprint at least one entity of the plurality of entities coupled to the network based on the plurality of entity clusters.

* * * * *